United States Patent
Koch et al.

(10) Patent No.: US 7,119,056 B2
(45) Date of Patent: Oct. 10, 2006

(54) FREE-FLOWING, AMPHIPHILIC, NON-IONIC OLIGOESTERS

(75) Inventors: Herbert Koch, Raesfeld (DE); Udo Schoenkaes, Haltura (DE)

(73) Assignee: SASOL Germany GmbH, Hamburg (DE)

( * ) Notice: Subject to any disclaimer, the term of this patent is extended or adjusted under 35 U.S.C. 154(b) by 189 days.

(21) Appl. No.: 10/363,078

(22) PCT Filed: Aug. 30, 2001

(86) PCT No.: PCT/DE01/03293

§ 371 (c)(1), (2), (4) Date: Sep. 12, 2003

(87) PCT Pub. No.: WO02/18474

PCT Pub. Date: Mar. 7, 2002

(65) Prior Publication Data

US 2005/0101667 A1    May 12, 2005

(30) Foreign Application Priority Data

Sep. 2, 2000  (DE)  ............................ 100 43 604

(51) Int. Cl.
   *C11D 17/00*   (2006.01)
(52) U.S. Cl. .............. 510/421; 510/405; 510/108; 510/109; 424/400; 424/405; 528/300; 528/302

(58) Field of Classification Search .................. None
See application file for complete search history.

(56) References Cited

U.S. PATENT DOCUMENTS

| 4,588,516 A | * | 5/1986 | Schwartz .................... 510/338 |
| 5,142,020 A | | 8/1992 | Kud et al. .................. 528/272 |
| 5,786,318 A | | 7/1998 | Blokzijl et al. ............. 510/299 |
| 6,153,723 A | | 11/2000 | Lang et al. ................ 528/300 |

FOREIGN PATENT DOCUMENTS

| EP | 0 752 468 A2 | 6/1996 |
| GB | 2 304 727 A | 3/1997 |

* cited by examiner

*Primary Examiner*—Michael P. Woodward
*Assistant Examiner*—Eric E. Silverman
(74) *Attorney, Agent, or Firm*—C. James Bushman; Browning Bushman P.C.

(57) ABSTRACT

The invention relates to amphiphilic, non-ionic oligoesters that are free-flowing at an ambient temperature. Said oligoesters are produced by reacting dicarboxylic acid compounds, polyol compounds of water-soluble alkylene oxide addition products and optionally diol compounds. The invention also relates to detergent formulations and concentrates containing the aforementioned oligoesters and the use of oligoesters as additives in detergents, in particular for cleaning hard surfaces.

10 Claims, No Drawings

FREE-FLOWING, AMPHIPHILIC, NON-IONIC OLIGOESTERS

The subject matter of the invention are amphiphilic, non-ionic oligoesters that are free-flowing at an ambient temperature. The oligoesters are produced by reacting dicarboxylic acid compounds, polyol compounds of water-soluble alkylene oxide addition products and optionally diol compounds. The invention also relates to detergent formulations and concentrates containing the aforementioned oligoesters and the use of oligoesters as additives in detergents, in particular for cleaning hard surfaces.

Modern washing and cleaning agent for formulations underlie a constant process of efficiency optimization. Therefore, the basic principle applies: "Greater wash/cleaning performance with the same or lower additive concentration". This trend is evidence by the invention and use of additives, which already increase the cleaning performance of the receptor with minimal additive concentration. Therefore, there is a particular need for additives, which have a multi-functionality and form, which enable an easy operation in the modern washing and cleaning agents.

A plurality of different poly and oligoester compounds are known as so-called "soil release/soil repellant polymers". The object of these compounds is to prevent dirt that has been removed from again settling onto the material, which can lead to a graying. Also, polymerized amphiphilic oligoester components, which produce tri-functional, or higher-functional, monomer components, are known.

From EP 0 752 468-A2, water-soluble copolymers with soil-releasing qualities are known, which contain one or more aromatic or sulfonating, dicarboxylic acids and at least 30 mole % of a polyol with at least three hydroxyl groups as monomer-units polyethylene glycol and/or closed polyethylene glycol. The products described in EP 0 752 468-A2 are waxy or resinous solid matter.

EP 0 442 101-B1 discloses polyesters, which are produced from:
a) carboxylic acid with at least two carboxyl groups, their esters, anhydrites, or mixture;
b) glycerin, pentaerythrite, oligoglycerin, and/or addition products of 1 to 5 mole of at least one alkylene coxide with 2 to 3 C-atoms to 1 mole of the named alcohol, as well as
c) water-soluble addition products of 5 to 80 mole of at least one alkylene oxide to 1 mole $C_8$–$C_{24}$ alcohol, $C_6$–$C_{18}$ alkylphenol, or $C_8$–$C_{24}$ alkyl-amine.

The described polyesters are waxy solids and are used as graying-inhibiting and dirt-releasing additives for powder and liquid detergent formulations.

WO 99/09125-A1 describes amphiphilic polymers based on polyesters with condensed acetyl groups, which are free-flowing in an ambient temperature, as well their use in washing and cleaning agents.

From DE 198 26 356-A1, oligoesters are a dirt-releasing detergent are known, which are produced by polycondensation of
(a) 40 to 52 mole % of one or: more cicarboxylic acids or their esters;
(b) 10 to 40 mole % ethylene glycol and/or propylene glycol;
(c) 3 to 20 mole % polyethylene glycol;
(d) 0.5 to 10 mole % of a water-soluble additive product of 5 to 80 mole of an alkylene oxide to 1 mole $C_1$–$C_{24}$ alcohol, $C_6$–$C_{18}$ alkyl phenol, or $C_6$–$C_{24}$ alkyl amine, as well as
(e) 0.4 to 10 mole % of one of more polyol pith 3 to 6 hydroxyl groups. According to Example 1 of DE 198 26 356-A1, the produced oligoester are solids.

A feature of the known soil-release/soil repellant polymers is their efficiency with fiber clearing, in particular, with the cleaning of polyester-/polyamide materials, or their mixtures with wool. The mode of operation essentially relates to a modification of the gibe surfaces with the assistance of the hydrophilic polymer.

The moisture transport (water absorption and absorptive capacity) is greatly improved with hydrophobic material that is treated with the soil-release polymer, such as polyester or polyamide materials or their mixture with wool. In addition, the polymers give the material antistatic and gliding qualities, whereby the handling of these fibers is facilitated in the textile processing. The treatment of the material with the soil-release polymer is to be understood as a type of impregnation, that is, the soil releasing polymer remains for many wash cycles on the fiber.

The known poly-/oligoester have the disadvantage that they only have a minimal effect as an additive in formulations for cleaning lard surfaces, such as, for example, plastics, metal, glass, ceramics, etc. In addition, many of the products are provided as solid matter. These mace difficult the operation of the oligoester in formulations for cleaning hard surfaces, which are in he form of liquid, paste, or gel-type formulations.

A further disadvantage of the known amphiphilic oligoester is its minimal physical stability in liquid or gel formulations. These lead essentially to deposition of the solid particles in the prepared cleaning formulation. In part, the amphiphilic oligoesters are offered as aqueous dispersions pith the disadvantage of a minimal active content of <20%, as well as the separation of the solid particles during the application of the aqueous dispersions.

The object of the present invention is to provide compounds of the above-described type, which do not have the noted disadvantages and, in particular, have the capacity to improve the cleaning performance of formulations for cleaning hard surfaces.

The object is solved according to the amphiphilic and non-ionic ionic oligoester that is free-flowing in an ambient temperature, characterized in that the oligoester is made by reacting, preferably polycondensation, of
(A) 20 to 50 mole %, preferably 30 to 40 mole %, of one or more dicarboxyllc compounds,
(B) 10.1 to 29.9 mole %, preferably 15 to 29 mole %, of one or more polyol compound with at least 3 OH-groups,
(C) 10.1 to 50 mole %, preferably 20 to 40 mole %, of one of more water-solble alkylene oxide addition products of one or more $C_2$- to $C_4$-alkylene oxide to a $C_1$- to $C_6$-alcohol in a molar ratio of 4 to 100 alkylene oxide, preferably 4 to 30 moles, alkylene oxide, to 1 mole alcohol and approximately
(D) 0 to 30 mole %, preferably 0.1 to 30 mole %, of one or more diol compounds.

The above information in moles % is taken as definitive and respectively, independent from one another and take reference on the sum of the components (A) through (D). The oligoester is made by using essentially no further components.

PREFERRED EMBODIMENTS OF THE SUBMECT MATTER OF THE DEPENDENT CLAIMS

The information "at ambient temperature" exists for temperatures of 15 to 25° C., in particular 20° C. Free-flowing means that it flows at ambient temperature under the inherent force of gravity. Compounds in the sense of the main claim of the present invention are organic compounds which along with carbon, hydrogen, and acid after reaction, that is formation in the oligomer, have not further atoms. This means that the dicarboxylic acid compounds after formation in the oligoester besides carboxyl groups, also can save carbonyl- or hydroxyl-groups, but, for example, have not sulfonyl- or halogen-groups.

As a dicarboxyl compound (A), aliphatic and/or aromatic dicarboxylic acids or their esters or anhydrides can be used. The dicarboxylic acid compounds preferably have 3 to 40 carbon atoms, with reference to the dicarboxylic acid or dicarboxylic group. Aromatic dicarboxylic compounds, according to the present invention, in particular, can be terephthalic acid, isophthalic acid, phtalic acid, its mono-arid diesters with $C_1$- to $C_5$-alcohol, such as, for example, dimethylterephtalide, whereby also mixes of these compounds are possible. Examples for the aliphatic dicarboxylic acid compounds are malonic acid, succinic acid-, smoke acid-, maleic acid-, glutaric acid, adipic acid, pimelic acid, suberic acid-, azelaic acid-, and sebacic acid-dialkylester. Preferably terephthalic acid, isophthalic acid, and phtalic acid, as well as their dimethyl-, diethyl-, dipropyl-, and dibutylesters are used.

The polyol compound (B) preferably has 3 to 12 carbon atoms. As examples for the polyol compound (B) with at least 3 OH-groups, the following are provided: penta-erythrite, trimetyl-olethane, trimethyol propane, 1,2,3 hexartriol, sorbite, mannite, mono-, di-, and triglycerins, 1,2,3, butantriol, 1,2,4 butantriol. The use of glycerin is preferred.

Examples for alkylene oxide addition produces (C) are addition products of ethylene oxide, propylene oxide, butylene oxide or their mixtures to aliphatic $C_1$- to $C_6$-alcohol, such as methanol, ethanol, propanol, or butanol, Preferred are additive products or ethylene oxide to methanol.

As the diol compound (D), according to the present invention, ethylene glycol 1,2 or 1,3 propylene glycol, neopentylglycol, 1,2 butylene glycol, 3 methoxy-1,2 propylene glycol, as well as their dimeres aid trimeres, are used. The diol compound (D) preferably has 2 to 20 carbon atoms. Essentially, also mixtures of different diols are possible. Preferred is the use of ethylene glycol and/or propylene glycol.

The synthesis of the oligoester can take place in the form of a direct reaction of all monomer components in one step, so that static polymers are produced. A different mode of manufacture is a multi-step synthesis, for example, of the type that a tire-condensation of different components takes place.

Essentially, with the synthesis, temperatures of approximately 80 to 350° C. and pressures of normal pressure to smaller than 1, bar, are used. Preferably, the condensation is performed in the temperature range of 150 to 280° C. in the presence of common polycondensation- and esterization-catalysts. In this manner, the average-weight mole masses of the produced polymers can be achieved. These preferably lie between 2000 and 5000 q/mol.

As catalysts compound described in the literature are suitable. If the free dicarboxylic acids or the anhydrides are used as the dicarboxylic acid compound A), then p-toluene sulfuric acid is the preferred catalyst. For dicarboxylic acid dialkylester as the d-carboxylic acid compound (A), the common esterization catalysts are used, such, for example, zinc acetate, mixtures of calcium acetate and antimony oxide, stannate or tetra alkoxy-titanite, such as titan-tetra-isobutanolate, or tetra-isopropanolate.

The concensation can be performed in the presence of anti-oxidants, for example, substitute phenols, such as for example, 2,5 ditertiary butylphenol, 2-methyl-cyclohexyl-4, 6-dimethylphenol, phosphoric acid or other antioxidants commonly used for this purpose. These compounds prevent oxidative coloration of the polyester during condensation.

As far as the color of the inventive oligoester not being able to be freely determined, this can be undertaken in a post-treatment. A typical post-treatment, for Example, is a bleaching with hydrogen-peroxide, which leads to a significant frightening of the color.

The inventive oligoesters can be used in various ways in cleaning agents, or detergents. They are free-flowing at ambient temperature and can be applied without further preparation as an additive in the cleaning agent products.

For example, then, the oligoester can be worked into a liquid or gal-type cleaner by stirring or dispersion. Essentially, these compounds can also be used in the form of a matrix. Under the term "matrix", the mixing of the oligoester with the following is meant:

non-ionic tensides, such as, for example, alcohol-ethoxylates, alcohol-propoxylates, mixed alcohol-alkoxylates, alkyl-poly-glucosides, glucose-amides, polytheylene-glycolenes, polypropylene-polycolenes, mixed polyalkylene-glycolenes, solutions with isopropanol, propylene-glycol, glycol-ether, water, etc.

By the mixing or packaging with other products, for example, even better free-flowing products with minimal viscosity can be produced.

The inventive, oligoesters can be added also to carrier materials, such as, for example, zeolite, phosphate, citrate, sodium sulfate, etc., and thus, for example, can be transferred into a fluid, powder compound. These types of compounds can be used advantageously in powder-type cleaners, granulated cleaners, and extruded and solid cleaning matter.

Therefore, it is advantageous to use products that represent the general formulation-components of the cleaning formulation.

The inventive oligoesters can be used in a plurality of washing- and cleaning agents. The oligoesters have a good compatibility with typical commercial cleaning agent formulations. The additive concentration of oligoester in the formulation is preferably 0.01 to 20% by weight, preferably 0.1 to 5% by weight. By the addition of the inventive product, the cleaning performance is improved and the tendency for resoiling of the cleaned surface is reduced.

Very heavily roaming cleaning agents can be used, or foam-free cleaning agents, such as those used in technical cleaning products. The formulations can be used for manual and machine cleaning.

The inventive formulations can, for example, be used as cleaners for hard surfaces in the household and place of business.

Neutral formulations are used, for example, as all-purpose cleaners in the household or for cleaning of motor vehicles. Acidic preparations, which have a lime-removing capability, are used, for example, in sanitary areas or as a bath cleaner, while alkaline formulations are used as universal, floor, and glass cleaners. Preferably, the pH-value of the combination or formulation, in which the inventive oligoester is used, is between 3 and 9.

Further examples of the inventive cleaning agent for hard surfaces are, for example, a cleaner for plastic surfaces, computer housing cleaner, auto- and rim cleaner, LKW plane cleaning, liquid, gel and block-shaped toilet cleaner and furniture polishes.

The oligoesters can also be used as additives in textile cleaning agents, such as solid detergents, fine detergents, curtain detergents, color detergents, carpet cleaning agents, impregnating means, etc.

In addition, the oligoester also can be used in fabric softening rinses. The addition of the product to the fabric softening rinses, which typically contain primarily cationic tensides, broadens the operating spectrum of the softening products, since the cationic tenside preferably operates on natural textile fibers, such as, for example, woolen fabrics. The inventive oligoester broadens the operating spectrum of synthetic fiber materials, I particular, polyester-containing types of materials. The non-ionic oligoester has a good compatibility with cationic softening rinse raw materials and car be used, therefore, commonly in the wash post-treatment and wash maintenance.

EXAMPLE 1

In a 2 l multiple-collar flask with a glass stirrer, heating bath, protective gas supply, distillation attachment, packed column, distillation bridge, vacuum separator, distillation flask, cooling trap, and internal thermometer, a total of 640 g (1.45 mole) polyethylene-glycol-monomethyl-ether is reacted with an average-weight molecular weight of approximately 440 g/mol (MARLIPAL® 1/12, CONDEA Chemie GmbH), 388 g (2.0 mole) dimethyl-teraphthalate, 110.5 g (1.2 mole) glycerin, 145, 8 g (1.4 mole) neopentylgycol, 1.0 g 2,6-ditertiary-butyl-p-cresol (Ioncl® from Shell), as well as 1 ml tetra-isopropyl-ortho-titariate under protective gas.

The reaction mixture is heated for a long time to temperatures of between 150 to 220° C. and the formed methanol is collected. After the large part of the theoretically anticipated methanol volume is collected, the reaction, mixture is cooled, the column constructed, the vacuum attached, and the mixture again heated to a maximal temperature of 230° C. The diol-/polyol that is not reacted is therefore collected as distillate.

After the oligoester has reached a hydroxyl count of approximately 90 mg KOH/g substance, the reaction is interrupted. The product appears as a yellow, low-viscosity oil.

EXAMPLE 2

In analogy to Example 1, a total of 883 g (2.0 mole) of polyethylene-glycol-monoethyl-ether is reacted with an average-weight molecular weight of approximately 440 g/mole (MARLIPAL® 1/12 Condea Chemie GmbR), 534 g (2.75 mole) dimethyl-terephthalate, 227.9 g (2.5 mole) glycerin, 68.3 g (1.1 mole) monoethylene glycol, 1.0 g. 2,6-ditertiary-butyl-p-cresol (Ionol® from Shell), as well as 1 ml tetra-isopropyl-orthotitinate.

After the oligoester has reached a hydroxyl count of 112 mg KOH/g substance, the reaction is interrupted. The product appears as a yellow, low-viscosity oil.

EXAMPLE 3

In analogy to Example 1, a total of 1168 g (2.65 mole) of polyethylene-glycol-monoethyl-ether is reacted with an average-weight molecular weight of approximately 440 g/mol (MARLIPAL® 1/12 CONDEA Chemie GmbH), 437 g (2.25 mole) dimethyl-terephthalat, 165.8 g (1.8 mole) glycerin, 1.0 g 2,6-ditertiary-butyl-p-cresol (Ionol® from Shell), as well as 1 ml tetra-isopropyl-orthotitinate.

After the oligoester has reached a hydroxyl count of 68 mg KOH/g substance, the reaction is interrupted. The product appears as a yellow oil.

EXAMPLE 4

In analogy to Example 1, a total of 800 g (1.8 mole) of polyethylene-glycol-monoethyl-ether is reacted with an average-weight molecular weight of approximately 440 g/mole (MARLIPAL®1/12 CONDEA Chemie GmbH), 485.5 g (2.5 mole) dimethyl-terephthalate, 184.2 g (2.0 mole) glycerin, 95.1 g (1.25 mole) 1,2 propylene-glyccl, 1.0 g 2,6 ditertiary-butyl-p-cresol (Ionol® from Shell), as well as 1 ml tetra-isopropyl-orthotitinate.

After the oligoester has reached a hydroxyl count of 106 mg KOH/g substance, the reaction is interrupted. The product appears a yellow, viscous oil.

EXAMPLE 5

Cleaning Performance on Hard Surfaces

The cleaning performance was determined corresponding with the testing methods of the industry association of the cleaning and maintenance agents for serviceability of all purpose cleaners (Qualitätsnorm des Industrieverbandes Putz- and Reinigungsmittel e.V. (IPP), Frakfurt a.M; Qualitätsnorm für Fussbodenpflege and Fussbodenreinigungsmittel, Seifen Öl Fette Wachse, 112(10)1986). With this scouring test, a test-soiled plastic foil is wiped with the assistance of a sponge, which has been submerged in cleaning solution, under defined specifications. The test concentration was 1 g tenside/1 cleaning solution. The IPP-test soil was a mixture of gasoline, oil, and black pigment. By means of the cleaning procedure, the dirt was removed from the plastic surface. The cleaning effect was determined with the assistance) of a color measuring apparatus as brightness compared with the untreated, white dirt carrier.

The cleaning performance of the commercial all purpose cleaner APC Commercial Product I and APC Commercial Product II and the APC Formulation III were determined with the help of the scouring test. Then, the inventive oligoester was added to she cleaning products in concentrations from 0.5; 1.0, or 1.5% by weight (with reference to the entire formulation), and the cleaning performance was determined anew. Multiple determination's were made and the average was calculated.

APC Commercial Product I

The General® "Mountain Spring" (UBA 0416 4747)

All purpose cleaner based on alcohol-ether-sulfate, alcohol-EO-PO, soap and isopropanol, WAS (wash-active substance), 9.5% by weight

| Oligoester Example 2 Brightness | | Oligoester Example 3 Brightness | |
| --- | --- | --- | --- |
| In % by weight | In % | In % by weight | In % |
| — | 57 | — | 57 |
| 0.5 | 65 | 0.5 | 68 |
| 1.0 | 76 | 1.0 | 75 |
| 1.5 | 79 | 1.5 | 78 |

By the addition of the inventive oligoester, the cleaning performance could be increased significantly. In contrast, the addition of the commercial product ZELCON® 5126 (1% by weight polymer, Manufacturer, DuPont) to APC Commercial Product I caused no improvement in the brightness.

APC Commercial Product II

Meister PROPER® (UBA 0673 3121)

All purpose cleaner based on fatty alcohol sulfate, alcohol-ethoxylate, cumol sulfate, citrate, and isoprophanol, WAS: 8% by weight.

| Oligoester Example 2 Brightness | | Oligoester Example 3 Brightness | |
|---|---|---|---|
| In % by weight | In % | In % by weight | In % |
| — | 50 | — | 50 |
| 0.5 | 54 | 0.5 | 62 |
| 1.0 | 61 | 1.0 | 73 |
| 1.5 | 65 | 1.5 | 75 |

By the addition of the inventive oligoester, the cleaning performance could be significantly increased.

APC Formulation III (Data in % Weight)

| | |
|---|---|
| MARLON ® A 350 (LAS-Na, CONDEA Chemie) | 16.0% |
| MARLIPAL ® 24/70 (C12–C14-alcohol-7eo, CONDEA CHEMIE) | 8.0% |
| SERDOLAMIDE ® PPF 67 (Coconut oil acid-diethanolamide, CONDEA Servo) | 0.5% |
| WAS-content | 16.5% |
| pH-value (unthinned) | approx. 8 |

| Oligoester Example 2 Brightness | | Oligoester Example 3 Brightness | |
|---|---|---|---|
| In % by weight | In % | In % by weight | In % |
| — | 53 | — | 53 |
| 0.5 | 55 | 0.5 | 55 |
| 1.0 | 70 | 1.0 | 75 |

By addition of the inventive oligoester, the cleaning performance could be increased significantly.

EXAMPLE 6

For testing of the compatibility, the inventive oligoesters were processed by stirring in ambient temperature in a cleaning agent. The appearance and the homeogeneity of the cleaning agent were noted directly after processing and after a 4-weed storage in ambient temperature.

The oligoesters have a good compatibility with the cleaning agent formulations. They could be processed in the test products APC Commercial Product I, APC commercial Product II, and APC Formulation III homogenously and stably for storage.

| Cleaner | Oligoester in % wt Example 2 | Oligoester in % wt. Example 3 | Appearance after processing | Appearance after 4 weeks storage |
|---|---|---|---|---|
| APC Product I | 0.5 | — | Clear | clear |
| APC Product I | 1.0 | — | Clear | Clear |
| APC Product I | 1.5 | — | Clear | Clear |
| APC Product II | 0.5 | — | Clear | Clear |
| APC Product II | 1.0 | — | Clear | Clear |
| APC Product II | 1.5 | — | Clear | Clear |
| APC Product II | — | 0.5 | Clear | Clear |
| APC Product II | — | 1.0 | Clear | Clear |
| APC Product II | — | 1.5 | Clear | Clear |
| APC Formulation III | 0.5 | — | Clear | Clear |
| APC Formulation III | 1.0 | — | Clear | Clear |
| APC Formulation III | — | 0.5 | Clear | Clear |
| APC Formulation III | — | 1.0 | Clear | Clear |

The invention claimed is:

1. Amphiphilic, non-ionic oligoesters consisting essentially of the polycondesnation product of
   (A) from 20 to 50 mole % of one or more dicarboxylic acid compounds,
   (B) 10.1 to 29.9 mole % of one or more polyol compounds with at least three OH-groups,
   (C) 10.1 to 50 mole % of one or more water-soluble alkylene oxide addition products of one or more $C_2$- to $C_4$-alkylene oxides and a $C_1$- to $C_6$-alcohol in a ratio of 4 to 100 moles of alkylene oxide to 1 mole of alcohol, and
   (D) 0.1 to 30 mole % of a diol selected from the group consisting of ethylene glycol, 1,2-propylene glycol, 1,3-propylene glycol, neopentylglycol, 1,2-butylene glycol, 3-methoxy-1,2-propylene glycol, dimers and trimers thereof and mixtures thereof, said oligoesters being free-flowing at ambient temperatures between 15–25°C.

2. The oligoester according to claim 1, characterized in that 1 to 10 mole % of the diol compounds (D) are used.

3. The oligoester according to claim 1, characterized in that the alkylene oxide addition product (C) is an addition product of 4 to 40 moles, ethylene oxide to methanol.

4. The oligoester according to claim 1, characterized in that the average-weight mole mass of the oligoester is less than 5000 g/mole.

5. The oligoester according to claim 4, characterized in that the average-weight mole mass lies between 2000 and 5000 g/mole.

6. The oligoester according to claim 4, characterized in that the average-weight mole mass of the alkylene oxide addition products (C) is less than 500 g/mole.

7. A detergent formulation comprising 0.01 to 20% by weight of the oligoester of claim 1.

8. A concentrate comprising 50 to 95% of the oligoester of claim 1 and a component selected from the group consisting of non-ionic surfactants, polyalkylene glycols, alkylene glycols, water and mixtures thereof.

9. A process for cleaning hard surfaces comprising applying the detergent formulation of claim 7 to the surface.

10. A process for cleaning hair comprising applying the detergent formulation of claim 7 to hair.

* * * * *